(12) United States Patent
Green et al.

(10) Patent No.: US 9,184,438 B2
(45) Date of Patent: *Nov. 10, 2015

(54) METHOD OF FABRICATING STRUCTURED PARTICLES COMPOSED OF SILICON OR A SILICON-BASED MATERIAL AND THEIR USE IN LITHIUM RECHARGEABLE BATTERIES

(75) Inventors: Mino Green, London (GB); Feng-Ming Liu, Reading (GB)

(73) Assignee: Nexeon Ltd., Oxfordshire (GB)

(*) Notice: Subject to any disclaimer, the term of this patent is extended or adjusted under 35 U.S.C. 154(b) by 1230 days.

This patent is subject to a terminal disclaimer.

(21) Appl. No.: 13/123,356

(22) PCT Filed: Oct. 2, 2009

(86) PCT No.: PCT/GB2009/002348
§ 371 (c)(1),
(2), (4) Date: Jul. 1, 2011

(87) PCT Pub. No.: WO2010/040985
PCT Pub. Date: Apr. 15, 2010

(65) Prior Publication Data
US 2011/0269019 A1    Nov. 3, 2011

(30) Foreign Application Priority Data
Oct. 10, 2008 (GB) .................................. 0818645.4

(51) Int. Cl.
*B44C 1/22* (2006.01)
*H01M 4/134* (2010.01)
(Continued)

(52) U.S. Cl.
CPC .............. *H01M 4/134* (2013.01); *H01M 4/049* (2013.01); *H01M 4/362* (2013.01); *H01M 4/661* (2013.01);
(Continued)

(58) Field of Classification Search
USPC ............................ 216/99, 104, 106; 438/753
See application file for complete search history.

(56) References Cited

U.S. PATENT DOCUMENTS

| 3,351,445 A | 11/1967 | Fielder et al. |
| 4,002,541 A | 1/1977 | Streander |

(Continued)

FOREIGN PATENT DOCUMENTS

| CN | 1447916 A | 10/2003 |
| CN | 1821446 A | 8/2006 |

(Continued)

OTHER PUBLICATIONS

Colinge, Jean-Pierre, "Silicon—on—Insulator Technology: Materials to VLSI", Chapter 2, SOI Materials, (1991), Cover page and p. 38.
(Continued)

*Primary Examiner* — Shamim Ahmed
(74) *Attorney, Agent, or Firm* — Fay Sharpe LLP (57) ABSTRACT

A process for etching silicon to form silicon pillars on the etched surfaces, includes treating silicon with an etching solution that includes 5 to 10M HF 0.01 to 0.1M $Ag^+$ ions and 0.02 to 0.2M $NO_3^-$ ions. Further, $NO_3^-$ ions in the form of alkali metal, nitric acid or ammonium nitrate salt is added to maintain the concentration of nitrate ions within the above range. The etched silicon is separated from the solution. The process provides pillars, especially for use as the active anode material in lithium ion batteries. The process is advantageous because it uses an etching bath containing only a small number of ingredients whose concentration needs to be controlled and it can be less expensive to operate than previous processes.

15 Claims, 2 Drawing Sheets

(51) Int. Cl.
  *H01M 4/04*   (2006.01)
  *H01M 4/36*   (2006.01)
  *H01M 4/66*   (2006.01)
  *H01M 10/052* (2010.01)
  *H01M 4/131*  (2010.01)
  *H01M 4/02*   (2006.01)

(52) U.S. Cl.
  CPC ............ *H01M 10/052* (2013.01); *H01M 4/131* (2013.01); *H01M 2004/028* (2013.01); *Y02E 60/122* (2013.01)

(56) References Cited

U.S. PATENT DOCUMENTS

| | | |
|---|---|---|
| 4,436,796 A | 3/1984 | Huggins et al. |
| 4,950,566 A | 8/1990 | Huggins et al. |
| 5,225,069 A * | 7/1993 | Haupt et al. ............... 205/325 |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,190,951 B1 * | 2/2001 | Nakahori et al. ............ 438/151 |
| 6,235,427 B1 | 5/2001 | Idota et al. |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 7,879,734 B2 * | 2/2011 | Fukutani et al. ............ 438/745 |
| 8,034,485 B2 | 10/2011 | Dahn et al. |
| 8,585,918 B2 * | 11/2013 | Green et al. ............... 216/99 |
| 8,597,831 B2 | 12/2013 | Green et al. |
| 8,772,174 B2 * | 7/2014 | Green et al. ............... 438/745 |
| 2001/0023986 A1 | 9/2001 | Mancevski |
| 2002/0074972 A1 | 6/2002 | Narang et al. |
| 2002/0148727 A1 | 10/2002 | Zhou et al. |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 * | 8/2004 | Li et al. ............... 428/404 |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1 | 5/2006 | Green |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0003835 A1 | 1/2007 | Hasegawa et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Ueda et al. |
| 2007/0059598 A1 | 3/2007 | Yang |
| 2007/0065720 A1 | 3/2007 | Hasegawa et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0157879 A1 * | 7/2007 | Yotsuya ............... 118/505 |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |

(56) References Cited

U.S. PATENT DOCUMENTS

| | | |
|---|---|---|
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0196760 A1 | 8/2010 | Green |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2011/0104480 A1* | 5/2011 | Malekos et al. ............. 428/336 |
| 2011/0250498 A1* | 10/2011 | Green et al. ............... 429/218.1 |

FOREIGN PATENT DOCUMENTS

| | | |
|---|---|---|
| CN | 101266919 A | 9/2008 |
| CN | 101371381 A | 2/2009 |
| CN | 101442124 A | 5/2009 |
| CN | 101471457 A | 7/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 980513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 6-283156 | 10/1994 |
| JP | 10-046366 | 2/1998 |
| JP | 10-83817 | 3/1998 |
| JP | 10-199524 | 7/1998 |
| JP | 2000-3727 | 1/2000 |
| JP | 2000-173594 | 6/2000 |
| JP | 2000-348730 A | 12/2000 |
| JP | 2001-291514 | 10/2001 |
| JP | 2002-279974 A | 9/2002 |
| JP | 2002260637 A | 9/2002 |
| JP | 2002-313319 A | 10/2002 |
| JP | 2002313345 A | 10/2002 |
| JP | 2003-017040 | 1/2003 |
| JP | 2003-168426 | 6/2003 |
| JP | 2003522367 A | 7/2003 |
| JP | 04-607488 | 2/2004 |
| JP | 2004-71305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2007-318057 A * | 12/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008-235258 A | 10/2008 |
| JP | 2008277000 A | 11/2008 |
| JP | 2009523923 A | 6/2009 |
| JP | 2009-252348 A | 10/2009 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| KR | 20100066441 A | 6/2010 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 | 7/2007 |
| WO | WO 2007/083155 | 7/2007 |
| WO | WO 2007/083155 A1 | 7/2007 |
| WO | WO 2007083152 A1 * | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/128310 A1 | 11/2010 |
| WO | WO 2010/130975 A1 | 11/2010 |
| WO | WO 2010/130976 A1 | 11/2010 |

(56) References Cited

FOREIGN PATENT DOCUMENTS

OTHER PUBLICATIONS

Deal et al., "General Relationship for the Thermal Oxidation of Silicon", Journal of Applied Physics, vol. 36, No. 12, (Dec. 1965) 3770-3778.
Feng et al., "Lithography-Free Silicon Micro-Pillars as Catalyst Supports for Microfabricated Fuel Cell Applications", Electrochemistry Communications, 8 (2006) 1235-1238.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Green et al., "Mesoscopic Hemisphere Arrays for use as Resist in Solid State Structure Fabrication", J. Vac. Sci. Technol. B 17(5) (1999) 2074-2083.
Yan et al., "Growth of Amorphous Silicon Nanowires via a Solid-Liquid-Solid Mechanism", Chemical Physics Letters, 323 (2000) 224-228.
Shin et al., "Porous Silicon Negative Electrodes for Rechargeable Lithium Batteries", Journal of Power Sources, 139 (2005) 314-320.
Li et al., "A High Capacity Nano-Si Composite Anode Material for Lithium Rechargeable Batteries", Electrochemical and Solid-State Letters, 2 (11) (1999) 547-549.
Ivanovskaya et al., "The Effect of Treatment of Cation-Selective Glass Electrodes With AgNO3 Solution on Electrode Properties", Sensors and Actuators B 24-25 (1995) 304-308.
Peng et al., "Fabrication of Large-Area Silicon Nanowire p-n. Junction Diode Arrays", Adv. Mater. (2004), vol. 16, No. 1, 73-76.
Peng et al., "Silicon Nanowires for Rechargeable Lithium-ion Battery Anodes", Applied Physics Letters (2008) vol. 93, No. 3, pp. 33105-1 to 33105-3.
British Search Report for GB0818645.4 dated Jan. 26, 2010.
Li et al., "The Crystal Structural Evolution of Nano-Si Anode Caused by Lithium Insertion and Extraction at Room Temperature", Solid State Ionics, 135 (2000) 181-191.
Huggins, Robert A., "Lithium Alloy Anodes" in Handbook of Battery Materials, J.O. Besenhard Ed., Wiley-VCH, Weinheim, 361-381 (1999).
Chang et al., "Ultrafast Growth of Single-Crystalline Si Nanowires", Materials Letters, 60 (2006) 2125-2128. Ei.
Kim et al., "Improvement of Silicon Powder Negative Electrodes by Copper Electroless Deposition for Lithium Secondary Batteries", Journal of Power Sources, 147 (2005) 227-233.
Jianfeng et al., "Large-Scale Array of Highly Oriented Silicon-Rich Micro/Nanowires Induced by Gas Flow Steering", Solid State Communications, 133 (2005) 271-275.
Lu et al., "A Study of the Mechanisms of Erosion in Silicon Single Crystals Using Hertzian Fracture Tests", Wear, 186-187 (1995) 105-116.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Pei et al., "Silicon Nanowires Grown from Silicon Monoxide Under Hydrothermal Conditions", Journal of Crystal Growth, 289 (2006) 423-427.
Chen et al., "Selective Etching of Silicon in Aqueous Ammonia Solution", Sensors and Actuators, A 49 (1995) 115-121.
Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.
Ohara et al., "A Thin Film Silicon Anode for Li-Ion Batteries Having a Very Large Specific Capacity and Long Cycle Life", Journal of Power Sources, 136 (2004) 303-306.
Peng et al., "Dendrite-Assisted Growth of Silicon Nanowires in Electroless Metal Deposition", Adv. Funct. Mater., 13, No. 2 (2003) 127-132.
Peng et al., "Synthesis of Large-Area Silicon Nanowire Arrays via Self-Assembling Nanoelectrochemistry", Adv. Mater., 14, No. 16 (2002) 1164-1167.
Peng et al., "Uniform, Axial-Orientation Alignment of One-Dimensional Single-Crystal Silicon Nanostructure Arrays", Angew. Chem. Ind. Ed., 44 (2005) 2737-2742.
Peng et al., "Simultaneous Gold Deposition and Formation of Silicon Nanowire Arrays", Journal of Electroanalytical Chemistry, 558 (2003) 35-39.
Canham, L. T., "Diffusion of Li IN Si", Properties of Silicon, EMIS Datareviews Series No. 4 (1987) 454-462. Li.
Qiu et al., "Self-Assembled Growth and Optical Emission of Silver-Capped Silicon Nanowires", Applied Physics Letters, vol. 84, No. 19, (2004) 3867-3869.
Kim et al., "(110) Silicon Etching for High Aspect Ratio Comb Structures", 1997 6th International Conference on Emerging Technologies and Factory Automation Proceedings, (1997) 248-252.
Sharma et al., "Thermodynamic Properties of the Lithium-Silicon System", J. Electrochem. Soc.: Electrochemical Science and Technology, vol. 123 (1976) 1763-1768.
Qiu et al., "From S1 Nanotubes to Nanowires: Synthesis, Characterization, and Self-Assembly", Journal of Crystal Growth, 277 (2005) 143-148.
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Wagner et al., "Vapor-Liquid-Solid Mechanism of Single Crystal Growth", Applied Physics Letters, vol. 4, No. 5 (1964) 89-90.
Lang, Walter, "Silicon Microstructuring Technology", Materials Science and Engineering, R17 (1996) 1-55.
Liu et al., "Effect of Electrode Structure on Performance of Si Anode in Li-Ion Batteries: Si Particle Size and Conductive Additive", Journal of Power Source, 140 (2005) 139-144.
Wen et al., "Chemical Diffusion in Intermediate Phases in the Lithium-Silicon System", Journal of Solid State Chemistry, 37 (1981) 271-278.
Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.
Yan et al., "$H_2$—Assisted Control Growth of Si Nanowires", Journal of Crystal Growth, 257 (2003) 69-74.
Liu et al., "A Novel Method of Fabricating Porous Silicon Material: Ultrasonically Enhanced Anodic Electrochemical Etching", Solid State Communications, 127 (2003) 583-588.
Zhang et al., "Bulk-Quantity Si Nanowires Synthesized by SiO Sublimation", Journal of Crystal Growth, 212 (2000) 115-118.
Wong et al., "Controlled Growth of Silicon Nanowires Synthesized Via Solid-Liquid-Solid Mechanism", Science and Technology of Advanced Materials, 6 (2005) 330-334.
Zhang et al., "Synthesis of Thin Si Whiskers (Nanowires) Using $SiCl_4$" Journal of Crystal Growth, 2006 (2001) 185-191.
Yoshio et al., "Electrochemical Behaviors of Silicon Based Anode Material", Journal of Power Sources, 153 (2006) 375-379.
Zhang et al., "Catalytic Growth of x-$FiSi_2$ and Silicon Nanowires", Journal of Crystal Growth, 280 (2005) 286-291.
Winter, et al., "Insertion Electrode Materials for Rechargeable Lithium Batteries", Advanced Materials, 1998, 10, No. 10.
Kasavajjula et al., "Nano- and Bulk-Silicon-Based Insertion Anodes for Lithium-Ion Secondary Cells", Journal of Power Sources, 163 (2007) 1003-1039.

(56) References Cited

OTHER PUBLICATIONS

Peng, et al., "Fabrication of Single-Crystalline Silicon Nanowires by Scratching a Silicon Surface with Catalytic Metal Particles", Adv. Funct. Mater., 16 (2006), 387-394.

Barraclough et al., "Cold Compaction of Silicon Powders Without a Binding Agent", Materials Letters 61 (2007) 485-487.

International Search Report for PCT/GB2009/002348 dated Dec. 10, 2009.

Written Opinion of the International Searching Authority for PCT/GB2009/002348 dated Dec. 10, 2009.

De Angelis et al., "Water Soluble Nanoporous Nanoparticles for In Vivo Targeted Drug Deliver and Controlled Release in B Cells Tumor Context", Nanoscale, 1020, vol. 2, p. 2230-2236, Date is not provided./SA/.

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Russo, et al., "A Mechanical Approach to Porous Silicon Nanoparticles Fabrication", Materials 2011, vol. 4, p. 1023-1033.

Takami et al., "Silicon Fiber Formed on Silicon Without Using a Gas Process", Journal of Applied Physics, vol. 91, No. 12, 2-5 (2002).

Ye et al., Controllable Growth of Silver Nanostructures by a Simple Replacement Reaction and Their SERS Studies, Solid State Sciences 11 (2009), p. 1088-1093.

Badel et al., "Formation of Ordered Pore Arrays at the Nanoscale by Electrochemical Etching of N-Type Silicon", Superlattices and Microstructures, 36 (2004) 245-253.

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

Besenhard et al., "Will Advanced Lithium-Alloy Anodes Have a Chance in Lithium-Ion Batteries?", Journal of Power Sources, 68 (1997) 87-90.

Boukamp et al., "All-Solid Lithium Electrodes with Mixed-Conductor Matrix", J. Electrochem. Soc.: Electrochemical Science and Technology, vol. 128, No. 4, (1981) 725-729.

Bourderau, et al., "Amorphous Silicon as a Possible Anode Material for Li-Ion Batteries", Journal of Power Sources, 81-82 (1999) 233-236.

Peng, K. et al., "Metal-Particle-Induced, Highly Localized Site-Specific Etching of Si and Formation of Single-Crystalline Si Nanowires in Aqueous Fluoride Solution", Chemistry a European Journal 2006, 12, pp. 7942-7947 (2006).

Chan et al., "Surface Chemistry and Morphology of the Solid Electrolyte Interphase on Silicon Nanowire Lithium-Ion Battery Anodes", Journal of Power Sources, 189(2), 1132-1140, (2009).

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chevrier et al., "Methods for Successful Cycling of Alloy Negative Electrodes in Li-Ion Cells", $220^{th}$ ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

El Ouatani et al., "The Effect of Vinylene Carbonate Additive on Surface Film Formation on Both Electrodes in Li-Ion Batteries", J. Electrochem. Soc., 156(2), A103-A113 (2009).

Han et al., "Neutralized Poly (Acrylic Acid) as Polymer Binder for High Capacity Silicon Negative Electrodes", $220^{th}$ ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2011), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Li et al., "Sodium Carboxymethyl Cellulose: A Potential Binder for Si Negative Electrodes for Li-Ion Batteries", Electrochemical and Solid-State Letters, 10(2) (2007), A17-A20.

Liu et al., "Enhanced Cycle Life of Si Anode for Li-Ion Batteries by Using Modified Elastomeric Binder", Electrochemical and Solid-State Letters, 8(2) (2005), A100-A103.

Obrovac et al., "Structural Changes in Silicon Anodes During Lithium Insertion/Extraction", Electrochemical and Solid-State Letters, 7(5), (2004), A96-A96.

Sugama, et al., "Nature of Interfacial Interaction Mechanisms Between Polyacrylic Acid Macromolecules and Oxide Metal Surfaces", Journal of Materials Science, 19 (1984) 4045-4056.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Yabuuchi et al., "Graphite-Silicon-Polyacrylate Negative Electrodes inlonic Liquid Electrolyte for Safer Rechargeable Li-Ion Batteries", Advanced Energy Materials, 1, (2011), 759-765.

Zhang et al., "A Review on Electrolyte Additives for Lithium-Ion Batteries", Journal of Power Sources, 162(2), 1379-1394, (2006).

Key to Metal Aluminum-Silicon Alloys, www.keytometals.com/Article80.

"Peng Yun, et al. "Comparative Analysis of Two Different Treatment Technology in PCB Spent Etching-Cyclic Regeneration Technique and Copper Sulfate Processing Technique", Printed Circuit Information, No. 7, pp. 51-53, dated Jul. 10, 2007." .

Uzun, Orhan et al., "Production and Structure of Rapidly Solidified Al-Si Alloys", Turk J Phys, 25, pp. 455-466 (2001).

\* cited by examiner

METHOD OF FABRICATING STRUCTURED
PARTICLES COMPOSED OF SILICON OR A
SILICON-BASED MATERIAL AND THEIR
USE IN LITHIUM RECHARGEABLE
BATTERIES

TECHNICAL FIELD

The invention relates to a method of fabricating silicon, e.g. silicon particle, having pillars etched on its surface, a method of making silicon fibres by detaching the pillars from the underlying silicon, an electrode containing such particles or fibres as its active material, an electrochemical cell and a lithium rechargeable cell anode.

BACKGROUND ART

The recent increase in the use of portable electronic devices such as mobile telephones and notebook computers and the emerging trend of using rechargeable batteries in hybrid electric vehicles has created a need for smaller, lighter, longer lasting rechargeable batteries to provide the power to the above mentioned and other battery powered devices. During the 1990s, lithium rechargeable batteries, specifically lithium-ion batteries, became popular and, in terms of units sold, now dominate the portable electronics marketplace and are set to be applied to new, cost sensitive applications. However, as more and more power hungry functions are added to the above mentioned devices (e.g. cameras on mobile phones), improved and lower cost batteries that store more energy per unit mass and per unit volume are required.

Figure 1:
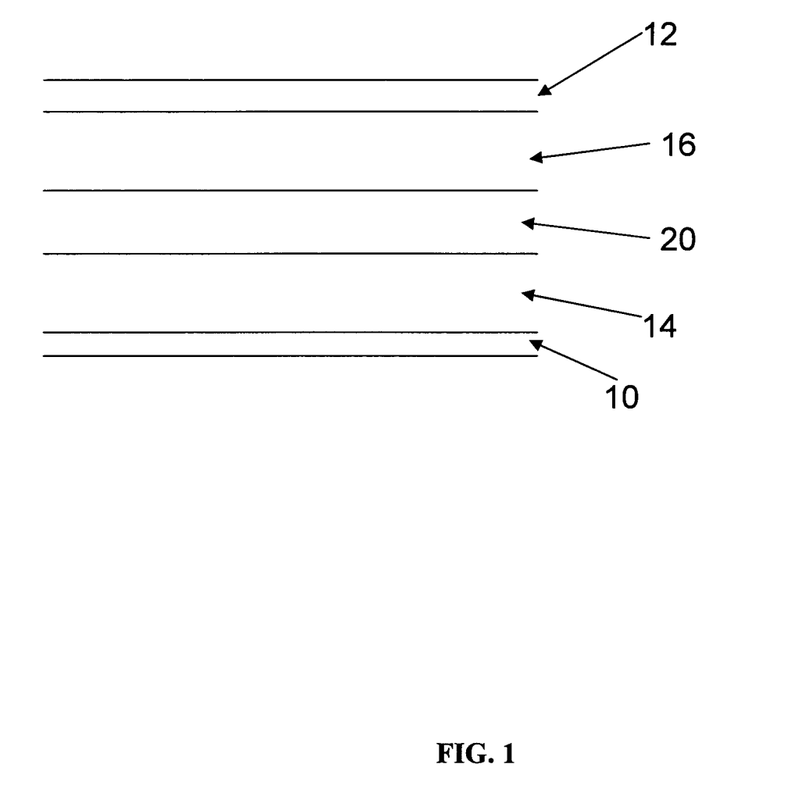
FIG. 1 is a schematic diagram showing the components of a battery cell.

The basic composition of a conventional lithium-ion rechargeable battery cell including a graphite-based anode electrode is shown in FIG. 1. The battery cell includes a single cell but may also include more than one cell.

The battery cell generally comprises a copper current collector for the anode 10 and an aluminium current collector for the cathode 12 which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16; a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

When the battery cell is fully charged, lithium has been transported from the lithium containing metal oxide via the electrolyte into the graphite-based layer where it reacts with the graphite to create the compound, $LiC_6$. The graphite, being the electrochemically active material in the composite anode layer, has a maximum capacity of 372 mAh/g. It will be noted that the terms "anode" and "cathode" are used in the sense that the battery is placed across a load.

It is well known that silicon can be used as the active anode material of a rechargeable lithium-ion electrochemical battery cell (see, for example, Insertion Electrode Materials for Rechargeable Lithium Batteries, M. Winter, J. O. Besenhard, M. E. Spahr, and P. Novak in Adv. Mater. 1998, 10, No. 10). It is generally believed that silicon, when used as an active anode material in a lithium-ion rechargeable cell, can provide a significantly higher capacity than the currently used graphite. Silicon, when converted to the compound $Li_{21}Si_5$ by reaction with lithium in an electrochemical cell, has a maximum capacity of 4,200 mAh/g, considerably higher than the maximum capacity for graphite. Thus, if graphite can be replaced by silicon in a lithium rechargeable battery the desired increase in stored energy per unit mass and per unit volume can be achieved.

Many existing approaches of using a silicon or silicon-based active anode material in a lithium-ion electrochemical cell, however, have failed to show sustained capacity over the required number of charge/discharge cycles and are thus not commercially viable.

One approach disclosed in the art uses silicon in the form of a powder having particles with a diameter of 10 μm in some instances made into a composite with or without an electronic additive and containing an appropriate binder such as polyvinylidene difluoride; this anode material is coated onto a copper current collector. However, this electrode system fails to show sustained capacity when subjected to repeated charge/discharge cycles. It is believed that this capacity loss is due to partial mechanical isolation of the silicon powder mass arising from the volumetric expansion/contraction associated with lithium insertion/extraction to and from the host silicon. In turn this gives rise to electrical isolation of the silicon particles from both the copper current collector and each other. In addition, the volumetric expansion/contraction causes the individual particles to be broken up causing a loss of electrical contact within the spherical element itself.

Another approach known in the art designed to deal with the problem of the large volume changes during successive cycles is to make the size of the silicon particles that make up the silicon powder very small, i.e. in the 1-10 nm range. This strategy does not prevent the electrical isolation of the spherical elements from both the copper current collector and themselves as the silicon powder undergoes the volumetric expansion/contraction associated with lithium insertion/extraction. Importantly, the large surface area of the nano-sized elements can give rise to the creation of a lithium-containing surface film that introduces a large irreversible capacity into the lithium-ion battery cell. In addition, the large number of small silicon particles creates a large number of particle-to-particle contacts for a given mass of silicon and these each have a contact resistance and may thus cause the electrical resistance of the silicon mass to be too high.

The above problems have thus prevented silicon particles from becoming a commercially viable replacement for graphite in lithium rechargeable batteries and specifically lithium-ion batteries.

In another approach described by Ohara et al. in Journal of Power Sources 136 (2004) 303-306 silicon is evaporated onto a nickel foil current collector as a thin film and this structure is then used to form the anode of a lithium-ion cell. However, although this approach gives good capacity retention, this is only the case for very thin films (say ~50 nm) and thus these electrode structures do not give usable amounts of capacity per unit area.

A review of nano- and bulk-silicon-based insertion anodes for lithium-ion secondary cells has been provided by Kasavajjula et al (J. Power Sources (2006), doi:10.1016/jpowsour.2006.09.84), herewith incorporated by reference herein.

Another approach described in UK Patent Application GB2395059A uses a silicon electrode comprising a regular or irregular array of silicon pillars fabricated on a silicon substrate. These structured silicon electrodes show good capacity retention when subjected to repeated charge/discharge cycles and this good capacity retention is considered by the present inventors to be due to the ability of the silicon pillars to absorb the volumetric expansion/contraction associated with lithium insertion/extraction from the host silicon without the pillars being broken up or destroyed. However, the structured silicon electrodes described in the above publication are fabricated by using a high purity, single crystal silicon wafer and hence the electrode is expensive.

Selective etching of silicon-based materials to create such silicon pillars is known from U.S. Pat. No. 7,033,936. According to this document, pillars are fabricated by creating a mask by depositing hemispherical islands of caesium chloride on a silicon substrate surface, covering the substrate surface, including the islands, with a film, and removing the hemispherical structures (including the film covering them) from the surface to form a mask with exposed areas where the hemispheres had been. The substrate is then etched in the exposed areas using reactive ion etching and the resist is removed, e.g. by physical sputtering, to leave an array of silicon pillars in the unetched regions, i.e. in the regions between the locations of the hemispheres.

An alternative, chemical approach is described in Peng K-Q, Yan, Y-J, Gao S-P, and Zhu J., Adv. Materials, 14 (2002), 1164-1167, Adv. Functional Materials, (2003), 13, No 2 February, 127-132 and Adv. Materials, 16 (2004), 73-76. Peng, et al. have shown a way to make nano pillars on silicon by a chemical method. According to this method, a silicon wafer, which may be n- or p-type and has the {111} face exposed to solution, is etched at 50° C. using the following solution: 5M HF and 20 mM AgNO$_3$. The mechanism postulated in these papers is that isolated nanoclusters of silver are electrolessly deposited on the silicon surface in an initial stage (nucleation). In a second (etching) stage, the silver nanoclusters and the areas of silicon surrounding them act as local electrodes that cause the electrolytic oxidation of the silicon in the areas surrounding the silver nanoclusters to form SiF$_6$ cations, which diffuse away from the etching site to leave the silicon underlying the silver nanocluster in the form pillars.

K. Peng et al., Angew. Chem. Int. Ed., 44 (2005), 2737-2742; and K. Peng et al., Adv. Funct. Mater., 16 (2006), 387-394, relate to a method of etching a silicon wafer that is similar to that described in the earlier papers by Peng et al but the nucleation/silver nanoparticle deposition step and the etching step are performed in different solutions. In a first (nucleation) step, a silicon chip is placed in a solution of 4.6M HF and 0.01M AgNO$_3$ for 1 minute. A second (etching) step is then performed in a different solution, namely 4.6M HF and 0.135M Fe(NO$_3$)$_3$ for 30 or 50 minutes. Both steps are carried out at 50° C. In these papers, a different mechanism is proposed for the etching step as compared to the earlier papers, namely that silicon underlying the silver (Ag) nanoparticles are removed and the nanoparticles gradually sink into the bulk silicon, leaving columns of silicon in the areas that are not directly underlying the silver nanoparticles.

In order to increase the uniformity and density of the pillars grown on silicon wafers and the speed of growth, it has been proposed in WO2007/083152 to conduct the process in the presence of an alcohol.

Figure 2:
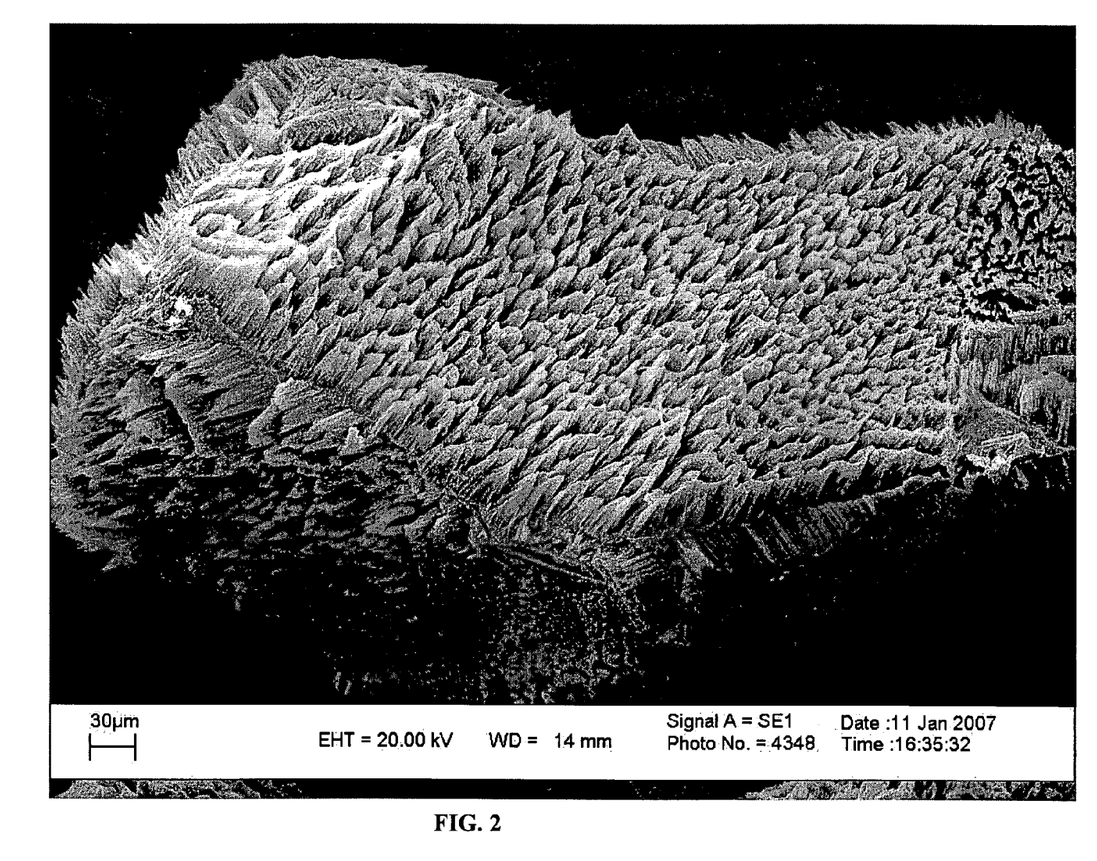
FIG. 2 is an electron micrograph of a pillared particle.

WO2009/010758 discloses the etching of silicon powder instead of wafers, in order to make silicon material for use in lithium ion batteries. The resulting etched particles, an example of which is shown in FIG. 2, contain pillars on their surface and the whole of the resulting particles can be used in the anode material of the batteries; alternatively, the pillars can be severed from the particles to form silicon fibres and only the silicon fibres are used to make the anode. The etching method used is the same as that disclosed in WO2007/083152.

DISCLOSURE OF THE INVENTION

The first aspect of the present invention provides a process for etching silicon to form pillars; the process is simple to operate on a commercial scale since it allows the silicon to be nucleated and etched in a single bath, i.e. it does not require the silicon to be moved from bath to bath, it uses an etching bath containing only a small number of ingredients whose concentration needs to be controlled and it can be cheaper to operate than previous processes.

The pillars formed in the process of the present invention are of good quality; when the silicon that is etched is in granular form, the product of the process can be "pillar particles", i.e. particles having pillars formed on their surface, or when the silicon that is etched is in bulk or granular form, the product of the process can be fibres, i.e. pillars that have been detached from the underlying silicon of the particles or the bulk silicon. The most important use of the pillar particles and fibres is to form anode material for lithium ion cells and the process provides excellent anode material.

The process of the present invention comprises:
treating silicon with a solution comprising:
5 to 10M HF, e.g. 6 to 8M HF
0.01 to 0.1M Ag$^+$ ions
0.02 to 0.2M NO$_3^-$ ions and
adding further NO$_3^-$ ions, e.g. in the form of an alkali metal nitrate or ammonium nitrate, to maintain the concentration of nitrate ions within the above range; and
separating the etched silicon from the solution.

SPECIFIC DESCRIPTION OF PREFERRED EMBODIMENTS

In the following description, the invention will be described by reference to etching of granular silicon to form etched silicon particles. However the same considerations apply also to silicon in the form of bulk material, e.g. silicon wafers.

The process of etching silicon granules will take place in two stages, nucleation and etching. In nucleation, islands of silver are deposited electrolessly on the silicon granules according to the reaction:

$$4Ag^+ + 4e^- \rightarrow 4Ag\text{(metal)}$$

Nucleation will generally take up to about 1 minute.

The etching occurs preferentially along certain crystal planes and the silicon is etched into columns. The silicon is etched according to the following equation:

$$Si + 6F^- \rightarrow SiF_6^{2-} + 4e^- \qquad \text{Half-reaction (1)}$$

The electrons generated by half reaction (1) are conducted through the silicon to the deposited silver where the counter reaction occurs in which silver ions in the solution are reduced to elemental silver:

$$4Ag^+ + 4e^- \rightarrow 4Ag\text{ (metal)} \qquad \text{Half-reaction (2)}$$

The deposited elemental silver forms dendrites extending from the initially deposited islands of silver. The dendrites will interlock with dendrites on the same particle and on other particles and so form a mat. The interconnection of the dendrites speeds up the electrolytic process because there are more sites where the reduction half reaction (2) can take place and the charge can be delocalised. Some gas will be evolved in the process and this can cause the mat to float.

Although the process can be stirred, there is no need to do so and it would be disadvantageous to do so if the stirring broke up the mat.

The granular silicon starting material may comprise undoped silicon, doped silicon of either the p- or n-type or a mixture, such as a silicon-aluminium doped silicon. It is preferred that the silicon has some doping since it improves the conductivity of the silicon during the etching process. We have found that p-doped silicon having $10^{19}$ to $10^{20}$ carriers/cc works well. Such material may be obtained by grinding doped silicon, e.g. silicon from the IC industry, and then sieving the ground material to obtain granules with the desired size.

Alternatively, the granules may be relatively low purity metallurgical grade silicon, which is available commercially; metallurgical grade silicon is particularly suitable because of the relatively high density of defects (compared to silicon wafers used in the semiconductor industry). This leads to a low resistance and hence high conductivity, which is advantageous when the pillar particles or fibres are used as anode material in rechargeable cells. Such silicon may be ground and graded as discussed above. An example of such silicon is "Silgrain" from Elkem of Norway, which can be ground and sieved (if necessary) to produce particles having a mean particle diameter in the range 5 to 500 µm, e.g. 15 to 500 µm, preferably 15 to 40 µm for pillar particles and 50 to 500 µm for making fibres. The granules may be regular or irregular in cross section.

When making silicon fibres, the granules remaining after the fibres have been removed can be recycled.

The granules may have a silicon-purity of 90.00% or over by mass, preferably 99.0% to 99.99%. The silicon can be doped with any material for example, germanium, phosphorous, aluminium, silver, boron and/or zinc The granules used for etching may be crystalline for example mono- or poly-crystalline with a crystallite size equal to or greater than the required pillar height. The polycrystalline particle may comprise any number of crystals for example two or more.

The process may be carried out at a temperature of 0° C. to 70° C., although it is easiest to carry it out at room temperature since only very expensive containers will be able to withstand the highly corrosive HF at temperatures towards the top end of the above range. For that reason the temperature will generally not exceed 40° C. If necessary, the reaction mixture may have to be cooled in the course of the process since it is exothermic.

The preferred material for the reaction container is polypropylene but other HF-resistant materials may be used instead.

The process should be terminated at a time when the silicon has been etched sufficiently to provide well-defined pillars of a height of 1 to 100 µm, e.g. 3 to 100 µm, more preferably 5 to 40 µm. The pillar height for pillar particles will generally be 5 to 15 µm and when making fibres will be larger, e.g. 10 to 50 µm. The optimum duration of the process will depend on the concentration of the materials in the solution, the conductivity of the silicon, the temperature and the amount of etching solution used as compared to the amount of granular silicon being etched.

The pillars will generally taper away from their bases, i.e. where they are attached to the underlying silicon, and the diameter of the pillars at their bases will generally be of the order of 0.08 to 0.70 µm, e.g. 0.1 to 0.5 µm, for example 0.2 to 0.4 µm, and such as 0.3 µm. The pillars will thus generally have an aspect ratio of greater than 10:1. The pillars may be substantially circular cross-section but they need not be.

A pillar surface density may be used to define the density of the pillars on the surface of the particle. Herein, this is defined as $F=P/[R+P]$ wherein: F is the pillar surface density; P is the total surface area of the particle occupied by pillars; and R is the total surface area of the particle unoccupied by pillars.

The larger the pillar surface density, the larger the lithium capacity per unit area of a silicon particle electrode and the larger the amount of harvestable pillars available to create fibres.

For example, using the above-mentioned silicon powder from Elken of Norway having a pre-etching mean particle diameter of 400 µm, pillars are produced all over the surface having a pillar height of approximately 10 to 50 µm, a diameter of approximately 0.2 to 0.5 µm and a pillar surface density, F, of 10-50%, more typically, 30%. In another example, granules having a pre-etching mean particle diameter of approximately 63-80 µm are found to produce pillars with a height of approximately 10 to 15 µm, with a coverage of approximately 30% and a diameter of approximately 0.2 to 0.5 µm.

The nucleation stage and the dendrite growth require the presence of silver in the solution, but once these stages are completed, etching requires only the presence of an ion in solution that can be reduced. This can be silver (half reaction 2) but equally it need not be and, since silver is expensive, it is preferred to use some other counter reaction. In WO2007/083152 the present applicants have suggested the addition of ferric nitrate to provide ferric ions that can be used reduced to ferrous ions in a counter reaction. However, we have found that the addition of ferric ions to the reaction mixture adds to the complexity and cost of the process.

WO2007/083152 also suggests the use of hydrogen ions to provide the counter reaction but the hydrogen and fluoride ions concatenate in solution, reducing the availability of hydrogen ions for this purpose.

We have found that the optimum counter reaction is the reduction of nitrate ions in solution. The nitrate ion is chosen because it is already present in the solution since silver will be added in the form of silver nitrate also because other anions may precipitate the silver. Although WO2007/083152 suggests that nitrate ions be added during the etching step, this is in the form of silver nitrate or ferric nitrate. The former is expensive and in the latter, the ferric ions will also be reduced with the disadvantages mentioned above. We therefore add nitrate to the etching solution as an alkali metal nitrate or ammonium nitrate, particularly sodium nitrate or ammonium nitrate because these materials have a high solubility but are also cheaper than ferric nitrate and have inert cations ($Na^+$ and $NH_4^+$) that are not detrimental in the solution.

Accordingly the solution is substantially free of iron ions (ferric or ferrous). By "substantially free" we mean that there is an insufficient concentration to have a material effect on the process and should generally be less than 0.05% by weight and less than 5 mM, e.g. less than 2 mM.

It was a feature of WO2007/083152 that an alcohol should be present in the nucleation stage and should be present in an amount of 1 to 40%. The process of WO2007/083152 was carried out on a chip or wafer and we have found that, in the context of the present process carried out on silicon granules, the presence of alcohol is not necessary and its presence complicates the process since it is another ingredient that must be considered when controlling the concentrations in the solution. Accordingly, the solution used in the present invention is, in accordance with one embodiment of the present invention, substantially free of an alcohol, by which is meant that the amount of any alcohol is less than the concentration that has a material effect on the process and may be less than 0.5% by volume.

The solution used initially in the present invention has a concentration of HF of 5-10 M, for example 6-8 M, e.g. 6.5M to 7.5M and generally about 7M or 7.5 M. There is no need to add further HF in the course of the process although this is possible if a large amount of material is etched compared to the volume of the solution.

In order to deposit the islands of silver and the dendrites, the concentration of $Ag^+$ may be in the range 0.01M to 0.1M, e.g. 0.02M to 0.06M and generally about 0.03M. The amount of $Ag^+$ ions is preferably insufficient to participate in the etching of all the silicon in the process but rather should be limited to an amount sufficient only to form the islands and dendrites. The half reaction that counters the etching half reaction is then provided by the reduction of nitrate ions. Silver is preferably not added to the solution after the etching reaction has started.

As indicated, $NO_3^-$ may provide a counter reaction to the etching of the silicon (half reaction (1)) and may be present in an amount of the concentration of 0.02M to 0.2M, e.g. 0.04M to 0.08M, e.g. about 0.06M The silver will generally be added to the etching solution in the form of its nitrate salt since other salts are generally insoluble. This will provide some of the nitrate ions required and any balance may be made up by adding alkali metal or ammonium nitrate, e.g. sodium, potassium or ammonium nitrate in the course of the process.

$SiF_6^{2-}$ will be present in the solution once etching has started.

The composition of the solution may be adjusted by adding a base, preferably NaOH or $NH_4OH$ because they are relatively cheap and the ions are highly soluble, or can be acidified with nitric acid.

Apart from water, the solution according to an embodiment of the present invention may contain no other ingredients. Such a solution would at the start of the process consist essentially of:

5 to 10, e.g. 6 to 8M HF
0.01 to 0.1M $Ag^+$ ions
0.02 to 0.2M $NO_3^-$ ions
water, hydrogen and hydroxyl ions
and optionally
$SiF_6^{2-}$ ions
alkali metal or ammonium ions, and
incidental additions and impurities.

The amount of etching solution used relative to the amount of silicon granules should be sufficient to etch the required pillars. We have found that 3 litres of the etching solution for 20 grams of silicon granules provides good results but the relative proportions might need to be adjusted as the quantities are scaled up or down.

Other aspects of the invention provide pillar particles or fibres made by the process and a composite electrode, especially an anode, containing such particles or fibres together with a current collector, which may optionally be made of copper. The composite electrode may be made by preparing a solvent-based slurry containing pillared particles or fibres made by the above process, coating the slurry onto a current collector and evaporating the solvent to create a composite film.

The present invention further provides an electrochemical cell, e.g. a rechargeable cell, containing an electrode as defined above and a cathode that comprises a lithium-containing compound capable of releasing and reabsorbing lithium ions as its active material, especially a lithium-based metal oxide or phosphate $LiCoO_2$ or $LiMn_xNi_xCO_{1-2x}O_2$ or $LiFePO_4$ and especially lithium cobalt dioxide.

The silicon fibres can be made by detaching the pillars from a particle of the first aspect by one or more of scraping, agitating (especially by ultrasonic vibration) or chemical etching.

The structured particles and fibres of the invention provide a good reversible reaction of silicon with lithium in a rechargeable cell. In particular by arranging the particles or fibres in a composite structure, that is a mixture of particles or fibres, a polymer binder and a conductive additive, or by directing bonding the particles or fibres to a current collector, the charge/discharge process becomes reversible and repeatable and good capacity retention is achieved. This good reversibility is considered by the present inventors to be due to the ability of both the silicon pillars forming part of the structured silicon particle and the silicon fibres to absorb the volumetric expansion/contraction associated with lithium insertion/extraction from the host silicon without the pillars being broken up or destroyed.

Importantly, the process described in this invention can use a low purity, metallurgical grade silicon as the feedstock silicon granules and hence reduces the cost of making silicon particles and fibres for use in electrodes of rechargeable cells as compared to the prior art use of silicon wafers as feedstock. As already mentioned, the silicon granules may be predominantly n- or p-type and may be etched on any exposed crystal face. Since the etching proceeds along crystal planes, the resulting pillars are single crystals. Because of this structural feature, the pillars will be substantially straight facilitating length to diameter ratio of greater than 10:1.

In overview the invention provides what the inventors believe are the optimum conditions for etching pillar particles of silicon or silicon fibres that are of especial application for use in rechargeable lithium ion cells.

The invention will now be illustrated by reference to one or more of the following non-limiting examples:

EXAMPLE 1

To Obtain Pillar Particles

The reaction was conducted in a polyethylene container with 8 litre volume. A lid is provided that has a hole for introducing ingredients and a stirrer. The following reactants were used:

| | |
|---|---|
| Silicon Powder—Si | Elkem Silgrain HQ J272.1, having a particle size of 20-40 µm; larger particle sizes were eliminated by sieving and washing the powder in deionised water 3 times |
| Hydrofluoric acid—HF | Aldrich Honeywell, 17735, 40% (w/w) semiconductor grade PURANAL ™ |
| $AgNO_3/HNO_3$ solution | concentrations of $AgNO_3$ and $HNO_3$ are 2.56M and 3.65M respectively |
| Sodium nitrate—$NaNO_3$ | Sigma-Aldrich, Anhydrous, crystal powder, ACS reagent, ≥99.0% |
| Sodium hydroxide—NaOH | VWR BDH AnalaR, Lot B0138150 734, Prod 102525P |

The reaction was conducted at room temperature (10-25° C.). 35 ml of the $AgNO_3/HNO_3$ solution containing. is mixed with 3 litres 7M HF solution in the reaction chamber and then 5.1 gram NaOH dissolved in 30 ml water is added. The resulting solution contains 0.0299M $AgNO_3$.

20 gram sieved Si powder (<40 μm) is added through the hole in the lid of the container by means of a funnel, and then the mass is gently stirred by hand, through the hole in the lid using a rod, for 1 minute.

This reaction mixture is allowed to stand for 40 minutes. A "mat" of silicon plus silver forms on the surface of the etch solution in the first 1-2 minutes.

After 40 minutes, 15 gram $NaNO_3$ (or 13 gram $NH_4NO_3$) is added. The $NaNO_3$ or $NH_4NO_3$ is dissolved into 50 ml water and then added through the funnel. The solution is then stirred for about 1 min after the $NaNO_3$ or $NH_4NO_3$ addition has been completed. The mixture is allowed to stand for a further 50 minutes. Then at 90 minutes from the start of the process, when the etching is almost complete, the spent etching solution starts to be pumped into a storage chamber, which takes about 4-5 minutes so the total etching time is about 95 minutes.

The mat is now washed with 3-4 litre water three times. The first two washes are such that the water is in contact for five minutes, while the third wash is a one minute wash. The wet mat, which is silicon and silver, should be promptly treated with nitric acid to remove the silver. The etched silicon is further washed and stored wet. The washing water contains silver and may be set aside to recover the silver content.

EXAMPLE 2

To Obtain Fibres

The reaction container and the reactants are the same as in Example 1. Again the reaction is conducted at room temperature since the reaction mixture does not get very hot.

40 ml of the $AgNO_3/HNO_3$ solution is mixed with 3 litres 7M HF solution in reaction chamber then 5.9 gram NaOH dissolved in 30 ml water is added. The final solution contains 0.033M $AgNO_3$.

20 gram Si powder (J272.1) is added through funnel at top of the container and the mass is gently stirred by hand, through the hole in the lid using a rod, for 1 minute. This reaction mixture is allowed to stand for 40 minutes. The "mat" of silicon plus silver forms on the surface of the etch solution in the first 1-2 minutes.

At the end of the 40 minutes, 14 gram $NaNO_3$ (or 12 gram $NH_4NO_3$) is added. The $NaNO_3$ or $NH_4NO_3$ is dissolved into 50 ml water and then added through funnel at top. Stirring the solution about 1 min after adding. The mixture is allowed to stand for a further 50 minutes. Then at 90 minutes from the start of the process, when the etching is almost completed, the spent etching solution starts to be pumped into a storage chamber, which takes about 4-5 minutes, and so the total etching time is about 95 minutes. Then the mat is washed with 3-4 litre water three times. The first two washes are such that the water is in contact for five minutes, while the third wash is a one minute wash.

The wet mat, which is composed of silicon and silver, should be promptly treated with nitric acid for 5~10 min to remove silver. The silicon is further washed and stored wet. The washing water contains silver and may be set aside to recover the silver content.

Fibres can be harvested from the resulting particles, with pillars attached, by ultrasonic vibration by placing the particles in a beaker or any appropriate container, covering the particles with an inert liquid such as ethanol or water and subjecting them to ultrasonic agitation. It is found that within several minutes the liquid is seen to be turbid and it can be seen by electron microscope examination that at this stage the pillars have been removed from the particle.

The pillars may be removed from the particle in a two stage process. In the first stage, the particles are washed several times in water and, if necessary, dried in a low vacuum system to remove the water. In the second stage, the particles are agitated in an ultrasonic bath to detach the pillars. These are suspended in water and then separated using a centrifuge to collect the silicon fibres.

EXAMPLE 3

Making an Anode

The pillared particles or fibres are used as the active material in a composite anode for lithium-ion electrochemical cells. To fabricate a composite anode, the pillared particles or fibres are mixed with polyvinylidene difluoride and made into a slurry with a casting solvent such as n-methylpyrrolidinone. This slurry can then be applied or coated onto a metal plate or metal foil or other conducting substrate for example physically with a blade or in any other appropriate manner to yield a coated film of the required thickness and the casting solvent is then evaporated from this film using an appropriate drying system which may employ elevated temperatures in the range of 50° C. to 140° C. to leave the composite film free or substantially from casting solvent. The resulting composite film has a porous structure in which the mass of silicon-based pillared particles or fibres is typically between 70 percent and 95 percent. The composite film will have a percentage pore volume of 10-30 percent, preferably about 20 percent.

Fabrication of the lithium-ion battery cell thereafter can be carried out in any appropriate manner for example following the general structure shown in FIG. 1 but with a silicon-comprising active anode material rather than a graphite active anode material. For example the silicon particle-based composite anode layer is covered by the porous spacer 18, the electrolyte added to the final structure saturating all the available pore volume. The electrolyte addition is done after placing the electrodes in an appropriate casing and may include vacuum filling of the anode to ensure the pore volume is filled with the liquid electrolyte.

Capacity retention is improved as the pillared structure of the silicon pillar particles or fibres allows for accommodation of the volume expansion associated with insertion/extraction (charging and discharging) of lithium.

Large sheets of silicon-based anode can be fabricated and then rolled or stamped out subsequently as is currently the case in graphite-based anodes for lithium-ion battery cells meaning that the approach described herein can be retrofitted with the existing manufacturing capability.

The invention claimed is:

1. A process of etching silicon to form silicon structures on the etched surfaces, the process comprising:
   treating silicon with an initial etching solution comprising:
   5 to 10M HF,
   0.01 to 0.1 M $Ag^+$ ions,
   a concentration within a range of 0.02 to 0.2M $NO_3^-$ ions, and
   subsequently adding further $NO_3^-$ ions in the form of an alkali metal nitrate or ammonium nitrate salt, or in the form of nitric acid, to maintain the concentration of $NO_3^-$ ions within the range specified for the initial etching solution; and
   separating the etched silicon from the solution.

2. The process of claim 1, wherein the further $NO_3^-$ ions are added in the form of an alkali metal nitrate salt or ammonium nitrate.

3. The process of claim 1, wherein the solution contains less than 0.05% by weight of iron ions, wherein said iron ions are ferric or ferrous.

4. The process of claim 1, wherein the solution contains less than 0.5% by volume of an alcohol.

5. The process of claim 1, wherein the solution consists essentially of:
5 to 10 M HF,
0.01 to 0.1 M $Ag^+$ ions,
0.02 to 0.2M $NO_3^-$ ions,
water, hydrogen and hydroxyl ions,
and optionally
$SiF_6^{2-}$ ions,
alkali metal or ammonium ions, and
incidental additions and impurities.

6. The process of claim 1, which is conducted in a single bath.

7. The process of claim 1, wherein the solution used initially has a concentration of HF of 6.5 to 9M.

8. The process of claim 1, further including a step of adjusting the composition by adding a base or nitric acid.

9. The process of claim 1, wherein the silicon that is treated with said etching solution is in the form of granules or bulk material.

10. The process of claim 1, wherein the silicon has a purity of 90.00% or over by mass.

11. The process of claim 1, wherein the silicon is in granular form.

12. The process of claim 11, wherein the granules have a particle size in the range of 5 to 500 µm to produce silicon particles having structures formed on their surfaces, the structures having a height in the range of 1 to 100 µm.

13. The process of claim 1 wherein the structures have a diameter at their bases in the range of 0.08 to 0.70 µm.

14. The process of claim 1, which includes the step of detaching the structures from the underlying silicon to form silicon fibres.

15. The process of claim 8, wherein the base is selected from the group consisting of NaOH and $NH_4OH$.

\* \* \* \* \*